(12) United States Patent
Jeon et al.

(10) Patent No.: US 7,400,413 B2
(45) Date of Patent: Jul. 15, 2008

(54) THREE-DIMENSIONAL SHAPE MEASURING APPARATUS USING SHADOW MOIRE

(75) Inventors: Moon Young Jeon, Gyeonggi-do (KR); Sang Kyu Yun, Chungju-si (KR)

(73) Assignee: Koh Young Technology Inc., Seoul (KR)

( * ) Notice: Subject to any disclaimer, the term of this patent is extended or adjusted under 35 U.S.C. 154(b) by 0 days.

(21) Appl. No.: 11/723,421

(22) Filed: Mar. 20, 2007

(65) Prior Publication Data
US 2007/0211259 A1 Sep. 13, 2007

(30) Foreign Application Priority Data
Nov. 13, 2006 (KR) ............... 10-2006-0111566

(51) Int. Cl.
*G01B 11/24* (2006.01)
*G01B 11/14* (2006.01)
(52) U.S. Cl. ................... 356/605; 356/618
(58) Field of Classification Search ......... 356/601–613, 356/618–624; 250/559.39, 559.22, 237 G
See application file for complete search history.

(56) References Cited

U.S. PATENT DOCUMENTS

| | | | | |
|---|---|---|---|---|
| 5,319,445 | A * | 6/1994 | Fitts | ............ 356/604 |
| 5,351,126 | A | 9/1994 | Takada et al. | |
| 6,731,391 | B1 * | 5/2004 | Kao et al. | ............ 356/605 |
| 6,791,695 | B2 * | 9/2004 | Lindsay et al. | ............ 356/520 |
| 6,906,809 | B2 * | 6/2005 | Fujiwara et al. | ............ 356/605 |
| 6,940,609 | B2 * | 9/2005 | Scheiner | ............ 356/605 |
| 7,230,722 | B2 * | 6/2007 | Han et al. | ............ 356/605 |

* cited by examiner

*Primary Examiner*—Sang Nguyen
(74) *Attorney, Agent, or Firm*—Rosenberg, Klein & Lee

(57) ABSTRACT

A 3D shape measuring apparatus using a shadow moire, which can measure a 3D shape of a test object by selectively switching on/off a plurality of illuminating parts irrespective of a form of the test object is provided. The 3D shape measuring apparatus using the shadow moire includes a grating 110, a grating moving part 120, a beam splitter part 130 being provided above the grating 110 to direct a first light source towards the grating 110 or pass a reflected image of a test object 102 reflected via the grating 110, a subsidiary illuminating part 140 being provided on one surface of the beam splitter part 130 to emit the first light towards the beam splitter part 130, an image sensor 150 being provided above the beam splitter part 130 to take the reflected image having passed through the beam splitter part 130, a plurality of illuminating parts 160 being inclined a predetermined angle of the viewing axis of the image sensor 140 to be positioned above the grating 110 and to be spaced apart from each other with an equivalent angle and emit a second light towards the grating 110, and a control part 170 controlling the grating moving part 120, the subsidiary illuminating part 140, the image sensor 150, and the plurality of illuminating parts 160, and thereby, transferring the image which is captured by the image sensor 150, in order to calculate a 3D shape of the test object 102, and controlling the plurality of illuminating parts 160 to be selectively switched on/off according to a shape of the test object 102.

10 Claims, 5 Drawing Sheets

THREE-DIMENSIONAL SHAPE MEASURING APPARATUS USING SHADOW MOIRE

BACKGROUND OF THE INVENTION

1. Field of the Invention

The present invention relates to a 3-dimensional (3D) shape measuring apparatus using a shadow moire, and more particularly, to a 3D shape measuring apparatus using a shadow moire, which can measure a 3D shape of a test object by selectively switching on/off a plurality of illuminating parts irrespective of a shape of the test object.

2. Description of the Related Art

A 3D shape measuring apparatus using a conventional moire will be described with reference to FIG. 1.

As shown in FIG. 1, the 3D shape measuring apparatus using the conventional moire includes a control part 10, a work stage 20, a projection part 30, a rotation part 40, and an image sensor 50. The control part 10 controls the 3D shape measuring apparatus, and thereby measures a 3D shape of a test object 21 by using a reflected image which is captured by the image sensor 50. In this instance, the test object 21 is moved to a measuring location to measure the 3D shape of the test object 21. The work stage 20 includes a fixing device 22 and a motor 23 to drive the test object 21 placed on the fixing device 22. When the test object 21 is moved to the measuring location, the projection part 30, the rotation part 40, and the image sensor 50 are provided above the fixing device 22 so as to measure the 3D shape.

The projection part 30 includes a light source 31, a projection grating 32, a grating moving part 32a, a projection lens 33, and a filter 34. The light generated from the light source 31 is projected via the projection grating 32, the projection lens 33, and the filter 34. The light in a form of a grating pattern is directed towards one surface of measuring object 21. To take a reflected image formed when the light in the form of the grating pattern is directed towards the test object 21, the image sensor 50 includes a lens 51 and a camera 52. When the reflected image of the grating-pattern light, which is directed towards one surface of the test object 21, is captured by the image sensor 50, the projection part 30 is rotated into another surface of the test object 21 along an arrow direction, so that the image sensor 50 may capture an image of another surface of the test object 21. The rotation part 40 is placed under the projection part 30 to rotate the projection part 30.

The rotation part 40 includes a support member 41 and a rotation member 42. A first hole 41a is formed in the support member 41 and thereby enables a grating pattern generated from the projection part 30 to be directed towards the test object 21. A second hole 42a is formed in another side of the rotation member 42 so that the reflected image of the test object 21 may pass through the second hole 42a to a location of the image sensor.

Also, there is another problem in that the 3D shape measuring apparatus using the conventional moire requires a grating moving part to move gratings to each projection part according to the number of projections.

Also, there is another problem that the 3D shape measuring apparatus using the conventional moire requires a grating moving part to move gratings to each projection part according to a number of projections parts by providing the grating to each projection part.

SUMMARY OF THE INVENTION

It is object of the present invention provides a 3D shape measuring apparatus using a shadow moire, which can measure a 3D shape of a test object by installing a grating above the test object and fixing a plurality of illuminating parts into a plurality of directions respectively and thereby selectively switching on/off the plurality of illuminating parts irrespective of a shape of the test object.

According to an aspect of the present invention, there is provided a 3-dimensional (3D) shape measuring apparatus using a shadow moiré comprising a grating being placed above a work stage to move a test object to a measuring location, a grating moving part including a grating moving actuator to move the grating, a beam splitter part being provided above the grating to direct a first light towards the grating or pass a reflected image of the test object, which is reflected via the grating, a subsidiary illuminating part being provided on one side surface of the beam splitter part to emit the first light towards the beam splitter part, an image sensor being provided above the beam splitter part to take the reflected image passed through the beam splitter part, a plurality of illuminating parts being inclined into a predetermined angle of the viewing axis of the image sensor, and each of the plurality of illuminating parts including a second light source, a second lens, and a second filter, and a control part controlling the grating moving part, the subsidiary illuminating part, the image formation part, and the plurality of illuminating parts and thereby transferring the image which is captured by the image sensor in order to calculate a 3D shape of the test object, and controlling the plurality of illuminating parts to be selectively switched on/off according to a shape of the test object.

BRIEF DESCRIPTION OF THE DRAWINGS

The above and other objects and advantages of the present invention will become more apparent by describing the preferred embodiments thereof in more detail with reference to the accompanying drawings in which.

DETAILED DESCRIPTION OF THE INVENTION

Preferred embodiments of the present invention will be described in detail with reference to the accompanying drawings.

Figure 2:
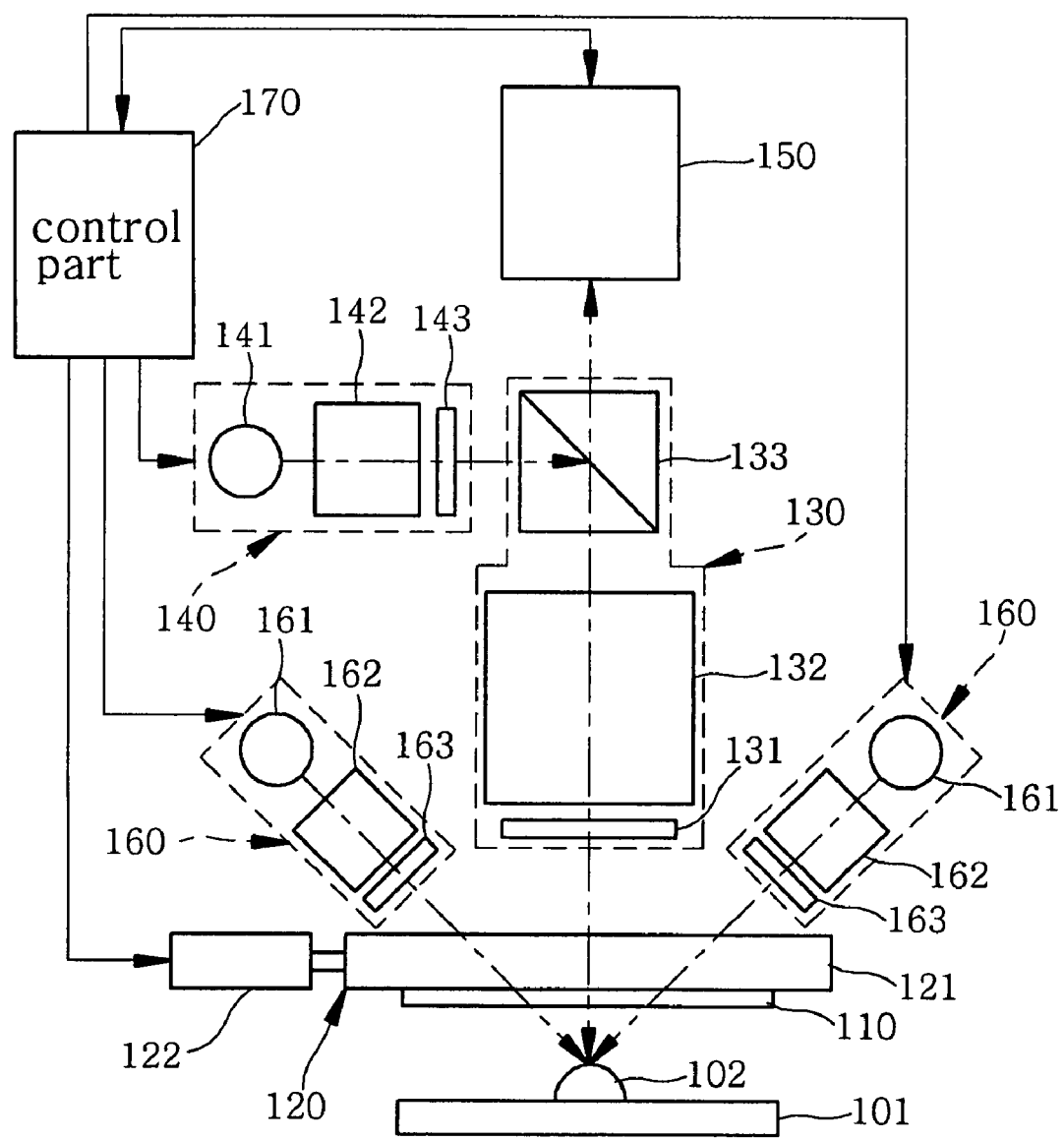
FIG. 2 is a side view illustrating a 3D shape measuring apparatus using a shadow moire according to the present invention.
Figure 3:
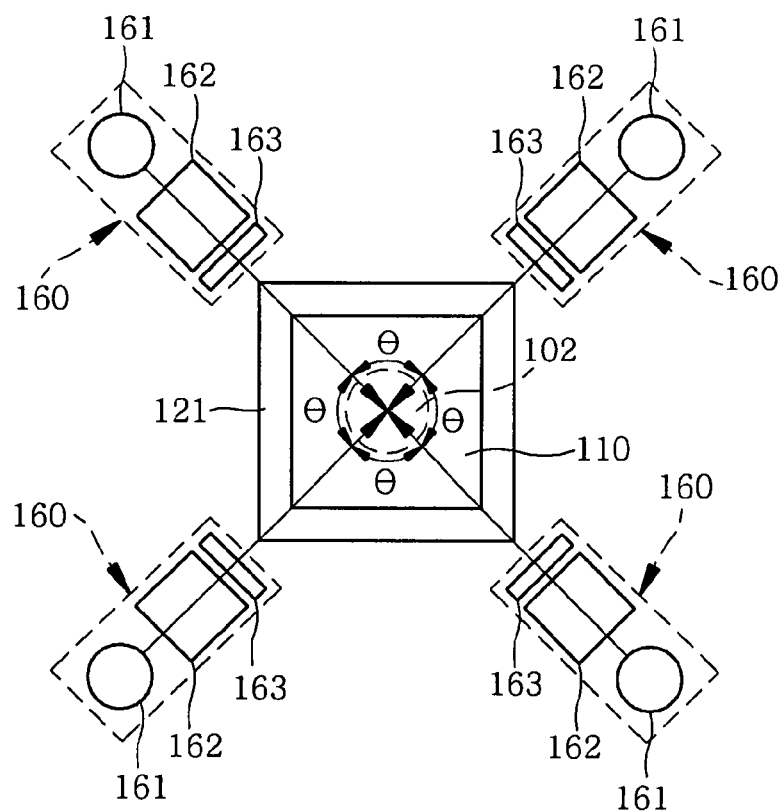
FIG. 3 is a front view illustrating the 3D shape measuring apparatus using the shadow moire of FIG. 2.

As shown in FIGS. 2 and 3, a 3D shape measuring apparatus using a shadow moire according to the present invention includes a grating 110 being placed above a work stage 101 that moves a test object 102 to a measuring location; a grating moving part 120 including and moving the grating 110; a beam splitter part 130 being provided above the grating 110 to emit a first light towards the grating 110 or pass a reflected image of the test object 102, which is reflected via the grating 110; a subsidiary illuminating part 140 being provided on one side surface of the beam splitter part 130 to emit the first light towards the beam splitter part 130; an image sensor 150 being provided above the beam splitter part 130 to receive the reflected image passed through the beam splitter part 130; a plurality of illuminating parts being provided to be inclined around the image sensor 150 to be positioned above the grating 110 and being spaced part from each other with an equivalent angle to emit a second light towards the grating 110; and a control part 170 controlling the grating moving part 120, the subsidiary illuminating part 140, the image sensor 150, and a plurality of illuminating parts 160, and thereby transferring the image which is captured by the image sensor 150, and controlling the plurality of illuminating parts 160 to be selectively switched on/off according to a shape of the test object 102.

Hereinafter, a configuration and operation of the 3D shape measuring apparatus using the shadow more according to the present invention, constructed as above, will be described in detail.

As shown in FIGS. 2 and 3, the 3D dimensional measuring apparatus using the shadow moire according to the present invention includes the work stage 101, the grating 110, the grating moving part 120, the beam splitter part 130, the subsidiary illuminating part 140, the image sensor 150, the plurality of illuminating parts 160, and the control part 170. Detailed descriptions related thereto will be sequentially made.

Figure 1:
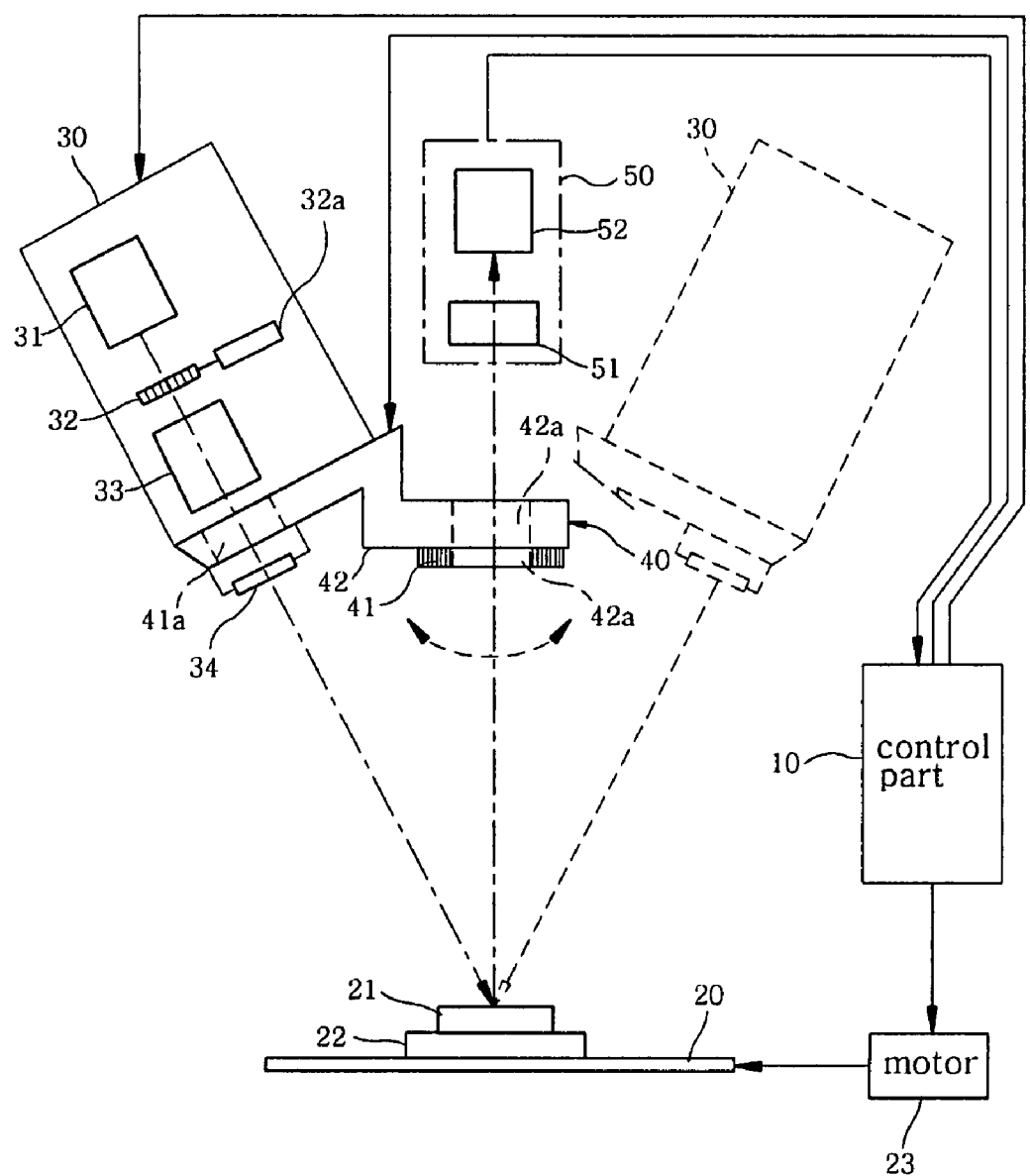
FIG. 1 is a side view illustrating a 3D shape measuring apparatus using a shadow moire according to a convention art.

The work stage 101 has a conventional configuration, i.e. includes a motor 23 as shown in FIG. 1. Due to a rotary force generated from the motor 23, the motor 23 moves the test object 102, which is placed on the work stage 101, to the measuring location, and the motor 23 is controlled by a control part. However, the motor 23 is simply not shown herein.

Figure 6:
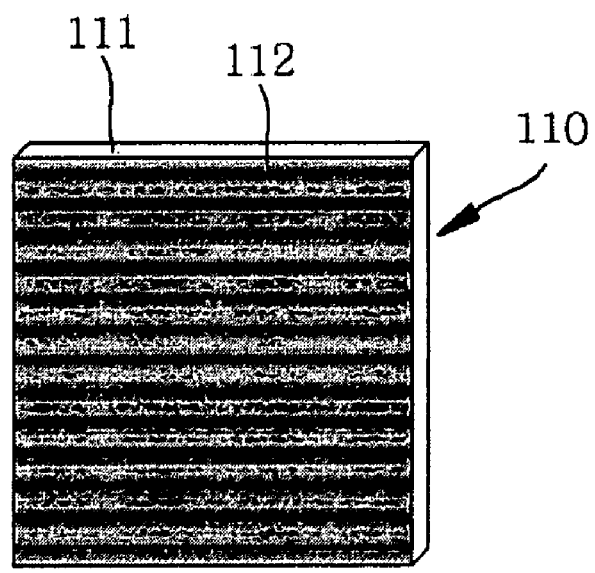
FIG. 6 is a perspective view illustrating a grating of FIG. 4.

Also, the grating 110 is provided above the work stage 101, and forms a grating pattern 112 on a glass substrate 111, as shown in FIG. 6.

Figure 4:
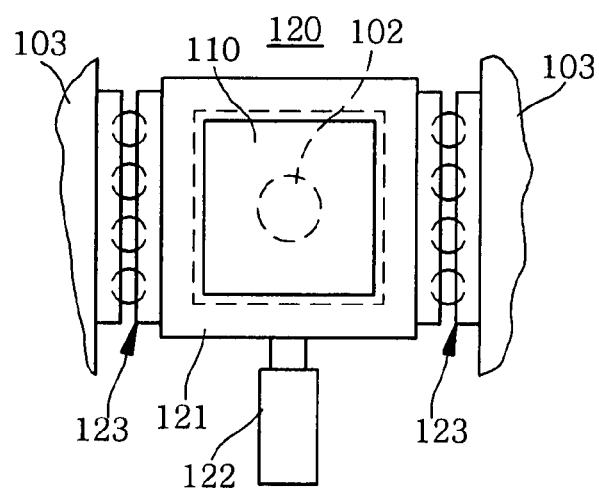
FIG. 4 is a front view illustrating a grating moving part of FIG. 2.
Figure 5:
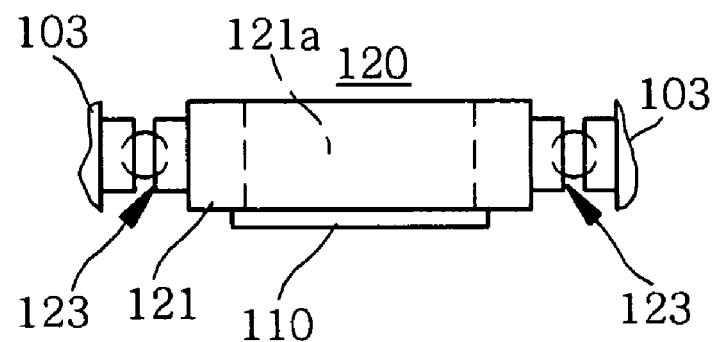
FIG. 5 is a side view illustrating the grating moving part of FIG. 4.

The grating moving part 120 is installed with the grating 110, and includes a grating moving member 121, a grating moving actuator 122, and a linear guide 123, as shown in FIGS. 4 and 5, to move the grating 110 according to a command of the control part 170.

A hole 121a is formed in the grating moving member 121, and includes the grating 110 on a top or a bottom of the hole 121a. The grating moving member 121 connects with the grating moving actuator 122, and is moved by the grating moving actuator 122 according to a command of the control part 170. Also, the linear guide 123 is provided to guide the grating moving member 121 when the grating moving member 121 is moved by the grating moving actuator 122. In this instance, the linear guide 123 is provided to each of both ends of the grating moving member 121, and is provided with a frame 103.

As shown in FIG. 2, the beam splitter part 130 is provided above the grating 110, and includes a third filter 131, a third lens 132, and a beam splitter 133 to direct a first light towards the grating 110 or pass a reflected image of the test object 102 which is reflected via the grating 110.

The third filter 131 is provided above the grating 110 to filter the first light which is directed via the subsidiary illuminating part 140 or filter the reflected image according to a grating pattern of the test object 102. The third lens 132 is place on the third filter 131 to direct the first light towards the third filter 131 or pass the reflected image filtered via the third filter 131. The beam splitter 133 reflects and emits the first light emitted via the subsidiary illuminating part 140 or passes the reflected image passed through the third lens 132 towards the image sensor 150.

As shown in FIG. 2, the subsidiary illuminating part 140 is provided on one side surface of the beam splitter part 130 and includes a first light source 141, a first lens 142, and a first filter 143, to direct a first light towards the beam splitter part 130.

When measuring a 2D image of the test object 102, the first light source 141 is controlled by the control part 170 to generate the first light. The first lens 142 is provided on one side surface of the first light source 141 to pass the first light generated from the first light source 141. The first filter 143 is provided on one side surface of the first lens 142 to filter the first light passed through the first lens 142 and direct the filtered first light towards the beam splitter part 130 and thereby direct the first light towards the grating 110 above the test object 102.

The image sensor 150 corresponds to a type of camera. As shown in FIG. 2, the image sensor 150 is provided above the beam splitter 130 to take the reflected image according to the grating pattern passed through the beam splitter 130 and transmit the captured image to the control part 170. Also, the control part 170 measures a 3D shape of the test object 102 using the image thereof transmitted from the image sensor 150.

As shown in FIGS. 2 and 3, the plurality of illuminating parts 160 is provided into four directions, respectively, above the test object 102, and is inclined around the image sensor 150 to be positioned above the grating 110. Also, the plurality of illuminating parts 160 is spaced apart from each other in an equivalent angle, and each of the plurality of illuminating parts 160 includes a second light source 161, a second lens 162, and a second filter 163.

The second light source 161 generates a second light. The second lens 162 is provided below the second light source 161 to pass the second light generated from the second light source 161. Also, the second filter 163 is provided below the second lens 162 to filter the second light having passed through the second lens 162 and directs filtered second light towards the grating 110 to form a grating pattern on the test object 102 below the grating 110. In this instance, the reflected image according to the grating pattern light generated from the test object 102 is generated, and the reflected image is directed towards the image sensor 150 via the beam splitter part 130. Therefore, the image sensor 150 may take the reflected image.

Figure 7:
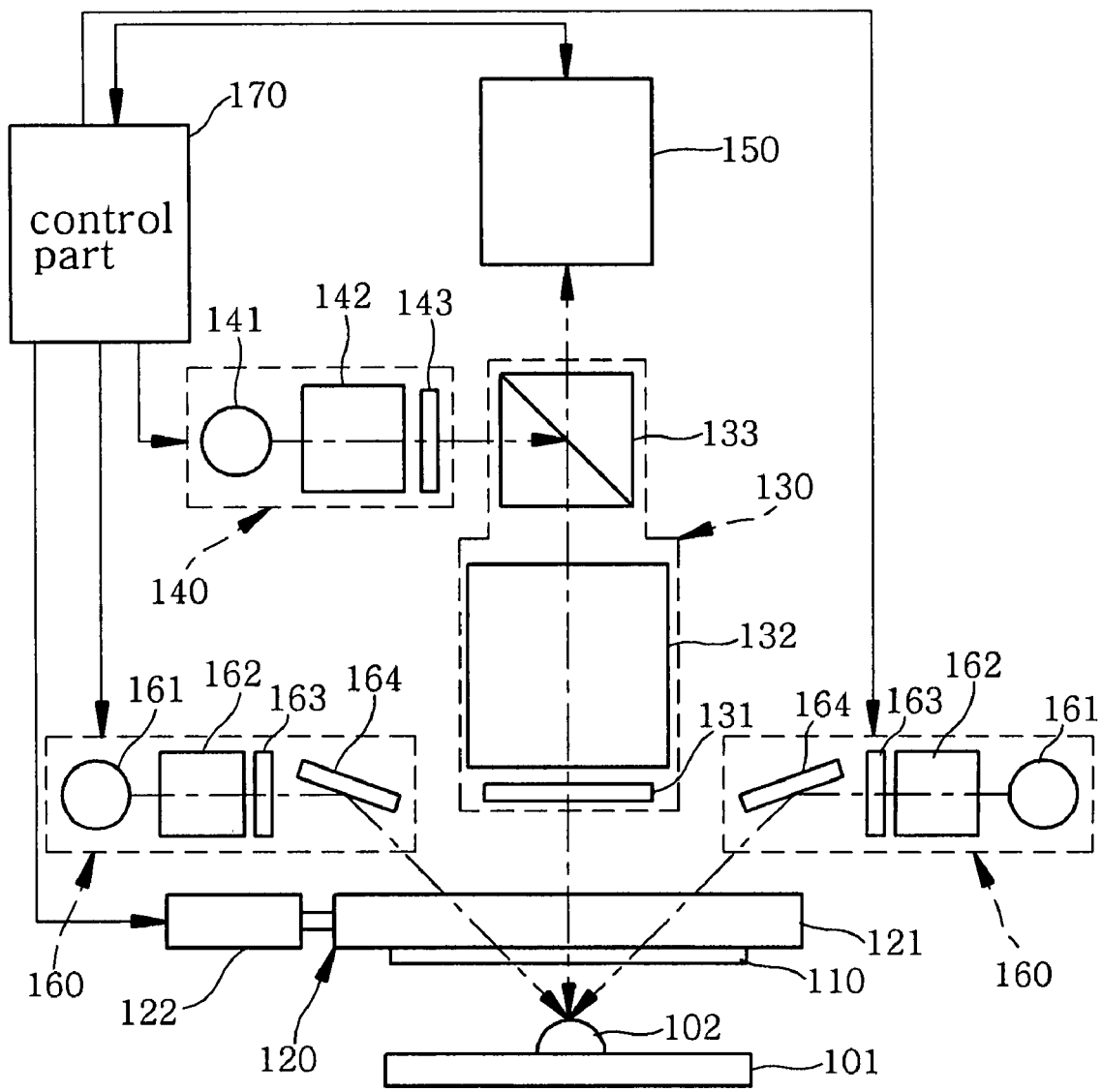
FIG. 7 is a perspective view illustrating another example of a second illuminating part of the 3D shape measuring apparatus using shadow moire of FIG. 2.

As another embodiment of the plurality of illuminating parts 160, as shown in FIG. 7, when the plurality of illuminating parts 160 is horizontally provided, a mirror 164 is provided to one side of each second filter 163 to direct the second light generated from each illuminating part 160 towards the grating 110. In this instance, the mirror 164 is provided to be inclined to reflect the emitted second light, which is filtered via the second filter 163, towards the grating 110.

When the second light is directed towards the test object 102 via the grating 110, a grating pattern is generated and thus a reflected image according to the grating pattern is reflected. The reflected image is directed towards the image sensor 150 via the beam splitter part 130 whereby the image sensor 150 may take the reflected image. When the reflected image is captured by the image sensor 150, the control part 170 receives the captured reflected image and then measures a 3D shape of the test object 102.

When measuring the 3D shape of the test object 102, the control part 170 controls each of the plurality of illuminating parts 160, as shown in FIG. 3, to be selectively switched on/off. As an example, when the test object 102 is formed in a shape of a square, the control part 170 switches on two illuminating parts 160 which horizontally face each other, and switches off remaining illuminating parts 160 to measure one surface and another surface of the test object 102. Also, when measuring the test object 102 in a shape of a hemisphere, the control part 170 switches on all of the plurality of illuminating parts 160 and thereby measures the 3D shape of the test object 102.

As described above, the control part 170 generally controls the 3D shape measuring apparatus using the shadow moire according to the present invention. Specifically, the control part 170 controls the grating moving part 120, the subsidiary illuminating part 140, the image sensor 150, and the plurality of illuminating parts 160. When the reflected image is captured by the image sensor 150, the control part 170 receives the reflected image, calculates the 3D shape of the test object, and controls the plurality of illuminating parts 160 to be selectively switched on/off according to a shape of the test object 102.

As described above, a 3D shape measuring apparatus using a shadow moire according to the present invention may measure a 3D shape of a test object irrespective of a form of the test object without rotating a plurality of illuminating parts by providing a grating above the test object and fixing the plurality of illuminating parts into a plurality of directions above the test object respectively.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A 3-dimensional (3D) shape measuring apparatus using a shadow moire comprising:

a grating moving part comprising a grating moving member which is installed with a grating, a grating moving actuator which connects with the grating moving member and moves the grating moving member, and a linear guide which guides the grating moving actuator;

a beam splitter part being provided above the grating moving part, and comprising a filter, a lens, and a beam splitter;

a subsidiary illuminating part being provided on one side of the beam splitter part to emit a light towards the beam splitter part;

an image sensor receiving taking a reflected image passed through the beam splitter part;

a plurality of illuminating parts being inclined at a predetermined angle of the viewing axis of the image sensor, each of the plurality of illuminating parts comprising a light source, a lens, and a filter; the plurality of illuminating parts being selectively operable to simultaneously illuminate the grating; and a control part controlling the grating moving part, the subsidiary illuminating part, the image sensor, and the plurality of illuminating parts, and thereby, transferring the image which is received by the image sensor, in order to calculate a 3D shape of a test object, and controlling the plurality of illuminating parts to be selectively switched on/off according to a shape of the test object.

2. The apparatus of claim 1, wherein the subsidiary illuminating part comprises:

a light source generating a light;

a lens disposed on one side of the light source to pass the light generated from the light source; and a filter disposed on one side of the lens to filter the light having passed through the lens and direct the filtered light towards the beam splitter part.

3. A 3-dimensional (3D) shape measuring apparatus using a shadow moire comprising:

a grating moving part comprising a grating moving member which is installed with a grating, a grating moving actuator which connects with the grating moving member and moves the grating moving member, and a linear guide which guides the grating moving actuator;

a beam splitter part being provided above the grating moving part;

a subsidiary illuminating part being provided on one side of the beam splitter part to emit a light towards the beam splitter part;

an image sensor receiving a reflected image passed through the beam splitter part;

a plurality of illuminating parts being inclined at a predetermined angle of the viewing axis of the image sensor, each of the plurality of illuminating parts comprising a light source, a lens, and a filter; and a control part controlling the grating moving part, the subsidiary illuminating part, the image sensor, and the plurality of illuminating parts, and thereby, transferring the image which is received by the image sensor, in order to calculate a 3D shape of a test object, and controlling the plurality of illuminating parts to be selectively switched on/off according to a shape of the test object; wherein the beam splitter part comprises:

a filter disposed above the grating to filter light emitted via the subsidiary illuminating part and direct the filtered light towards the grating or filter a reflected image of the test object;

a lens disposed above the filter to direct light towards the filter or pass the reflected image filtered via the filter; and a beam splitter disposed above the lens to reflect the light emitted via the subsidiary illuminating part or pass the reflected image passed through the lens.

4. A 3D shape measuring apparatus using a shadow moire comprising:

a grating moving part comprising a grating moving member which is installed with a grating, a grating moving actuator which connects with the grating moving member and moves the grating moving member, and a linear guide which guides the grating moving actuator;

a beam splitter part being provided above the grating moving part, and comprising a filter, a lens, and a beam splitter;

a subsidiary illuminating part being provided on one side of the beam splitter part to emit a light towards the beam splitter part;

an image sensor receiving a reflected image passed through the beam splitter part;

a plurality of illuminating parts being horizontally provided, each of the plurality of illuminating parts comprising a light source to emit a light, a lens, a filter, and an inclined mirror to reflect the light having passed though the filter towards the grating; said plurality of illuminating parts being selectively operable to simultaneously illuminate the grating; and a control part controlling the grating moving part, the subsidiary illuminating part, the image sensor, and the plurality of illuminating parts, and thereby, transferring the image-which is received by the image sensor, in order to calculate a 3D shape of a test object, and controlling the plurality of illuminating parts to be selectively switched on/off according to a shape of the test object.

5. A 3D shape measuring apparatus using a shadow moire comprising:
  a grating being placed above a work stage, whereby said work stage moves a test object to a measuring location;
  a grating moving part which is installed with the grating to move the grating;
  a beam splitter part being provided above the grating to direct a light towards the grating or pass a reflected image of the test object;
  a subsidiary illuminating part being provided on one side of the beam splitter part to emit light towards the beam splitter part;
  an image sensor being provided above the beam splitter part to receive the reflected image having passed through the beam splitter part;
  a plurality of illuminating parts being inclined at a predetermined angle of the viewing axis of the image sensor to be positioned above the grating and to be spaced apart from each other with an equivalent angle and emit a light towards the grating; the plurality of illuminating parts selectively operable to simultaneously illuminate the grating; and
  a control part controlling the grating moving part, the subsidiary illuminating part, the image sensor, and the plurality of illuminating parts, and thereby, transferring the image which is captured by the image sensor, in order to calculate a 3D shape of the test object, and controlling the plurality of illuminating parts to be selectively switched on/off according to a shape of the test object.

6. The apparatus of claim 5, wherein the grating moving part comprises:
  a grating moving member provided with a through hole and includes the grating on a bottom surface;
  a grating moving actuator which connects with and moves the grating moving member; and
  a linear guide disposed on each end of the grating moving member and guides the grating moving member when the grating moving actuator moves the grating moving member.

7. The apparatus of claim 5, wherein the subsidiary illuminating part comprises:
  a light source generating a light;
  a lens disposed on one side of the light source to pass the light generated from the light source; and
  a filter disposed on one side of the first lens to filter the light having passed through the lens and direct the filtered light towards the beam splitter part.

8. The apparatus of claim 5, wherein the plurality of illuminating parts is disposed in four directions around the test object respectively, and each of the plurality of illuminating parts comprises:
  a light source generating a light;
  a lens disposed below the light source to pass the light generated from the light source; and
  a filter disposed below the lens to filter the light having passed through the lens and direct the filtered light towards the grating.

9. The apparatus of claim 5 or 8, wherein each of the plurality of illuminating parts further includes a mirror which is provided to be inclined on one side of the filter to direct the light generated from each of the plurality of illuminating parts towards the grating.

10. A 3D shape measuring apparatus using a shadow moire comprising:
  a grating being placed above a work stage, whereby said work stage moves a test object to a measuring location;
  a grating moving part which is installed with the grating to move the grating;
  a beam splitter part being provided above the grating to direct a light towards the grating or pass a reflected image of the test object;
  a subsidiary illuminating part being provided on one side of the beam splitter part to emit a light towards the beam splitter part;
  an image sensor being provided above the beam splitter part to receive the reflected image having passed through the beam splitter part;
  a plurality of illuminating parts being inclined at a predetermined angle of the viewing axis of the image sensor to be positioned above the grating and to be spaced apart from each other with an equivalent angle and emit a light towards the grating; and
  a control part controlling the grating moving part, the subsidiary illuminating part, the image sensor, and the plurality of illuminating parts, and thereby, transferring the image which is captured by the image sensor, in order to calculate a 3D shape of the test object, and controlling the plurality of illuminating parts to be selectively switched on/off according to a shape of the test object;
wherein the beam splitter part comprises:
  a filter disposed above the grating to filter the light emitted via the subsidiary illuminating part and direct the filtered light towards the grating or filter the reflected image of the test object;
  a lens disposed on the filter to direct the light via the filter or pass the reflected image filtered via the filter; and
  a beam splitter disposed above the lens to reflect the light emitted via the subsidiary illuminating part or pass the reflected image having passed through the lens.

* * * * *